(12) United States Patent
Fredinburg et al.

(10) Patent No.: US 10,477,159 B1
(45) Date of Patent: Nov. 12, 2019

(54) AUGMENTED REALITY DISPLAY FOR IDENTIFYING VEHICLES TO PRESERVE USER PRIVACY

(71) Applicant: Waymo LLC, Mountain View, CA (US)

(72) Inventors: Dan Fredinburg, Mountain View, CA (US); Brian Kemler, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 435 days.

(21) Appl. No.: 14/244,389

(22) Filed: Apr. 3, 2014

(51) Int. Cl.
*H04N 7/18* (2006.01)

(52) U.S. Cl.
CPC .................. *H04N 7/183* (2013.01)

(58) Field of Classification Search
CPC ........ H04N 7/183; G06Q 30/02; G06Q 10/08; G07C 5/008; H04M 3/5116
See application file for complete search history.

(56) References Cited

U.S. PATENT DOCUMENTS

| 6,356,838 | B1 | 3/2002 | Paul |
| 6,414,635 | B1 | 7/2002 | Stewart et al. |
| 6,545,601 | B1* | 4/2003 | Monroe ............. B64D 45/0015 340/3.1 |
| 6,812,851 | B1 | 11/2004 | Dukach et al. |
| 7,920,071 | B2 | 4/2011 | Baillot |
| 8,346,426 | B1 | 1/2013 | Szybalski et al. |
| 9,429,947 | B1 | 8/2016 | Wengreen et al. |
| 9,436,180 | B1 | 9/2016 | Fredinburg et al. |
| 9,547,307 | B1 | 1/2017 | Cullinane et al. |
| 9,551,992 | B1 | 1/2017 | Barton-Sweeney et al. |
| 2002/0028002 | A1* | 3/2002 | Whited ................ A01K 63/003 382/110 |
| 2002/0038181 | A1* | 3/2002 | Okude ................... G01C 21/32 701/458 |
| 2002/0058517 | A1 | 5/2002 | Furukawa et al. |

(Continued)

OTHER PUBLICATIONS

Böse, et al., "Autonomously controlled storage management in vehicle logistics—applications of RFID and mobile computing systems", International Journal of RF Technologies: Research and Applications 2008, iFirst Article, pp. 1-20.

(Continued)

*Primary Examiner* — Joseph Suh
(74) *Attorney, Agent, or Firm* — Botos Churchill IP Law (57) ABSTRACT

Aspects of the application relate to protecting the privacy of a user of a dispatching service for driverless vehicles. For example, a client computing device may send a request for a vehicle, the request identifying a location of the client computing device. Location information identifying a current location of a vehicle dispatched to the location of the client computing device is received in response to the request. A camera view is displayed on a display of the client computing device, the camera view corresponding to information in a field of view of a camera of the client computing device. When current location of the vehicle is within the field of view of the camera and a threshold distance of the location of the client device, an indicator is displayed on the display at a location corresponding to the current location of the vehicle.

20 Claims, 10 Drawing Sheets

(56) References Cited

U.S. PATENT DOCUMENTS

| | | | |
|---|---|---|---|
| 2002/0075201 A1* | 6/2002 | Sauer | G02B 27/017 345/7 |
| 2002/0183920 A1* | 12/2002 | Smith | G06Q 30/02 701/117 |
| 2003/0125845 A1* | 7/2003 | Carlstedt | G01S 5/0072 701/1 |
| 2003/0222794 A1* | 12/2003 | Vial | G01C 23/005 340/961 |
| 2004/0076280 A1 | 4/2004 | Ando et al. | |
| 2004/0102898 A1* | 5/2004 | Yokota | G01C 21/3691 701/414 |
| 2004/0128065 A1* | 7/2004 | Taylor | B60C 23/0408 701/431 |
| 2005/0018066 A1* | 1/2005 | Hofer | H04N 5/23212 348/333.02 |
| 2005/0104745 A1* | 5/2005 | Bachelder | F41G 9/00 340/906 |
| 2005/0114014 A1* | 5/2005 | Isaac | G01C 21/26 701/465 |
| 2005/0153707 A1 | 7/2005 | Ledyard et al. | |
| 2005/0225636 A1* | 10/2005 | Maemura | B60R 1/00 348/148 |
| 2005/0231419 A1* | 10/2005 | Mitchell | G08G 5/0026 342/36 |
| 2007/0197231 A1 | 8/2007 | Lin | |
| 2007/0279521 A1* | 12/2007 | Cohen | G06K 9/00664 348/376 |
| 2008/0225137 A1* | 9/2008 | Kubo | H04N 5/23203 348/231.2 |
| 2009/0192851 A1 | 7/2009 | Bishop | |
| 2009/0234573 A1 | 9/2009 | Notarantonio | |
| 2010/0194596 A1* | 8/2010 | Wang | B60R 1/00 340/936 |
| 2010/0228574 A1 | 9/2010 | Mundinger et al. | |
| 2010/0241349 A1 | 9/2010 | Wu | |
| 2010/0265048 A1* | 10/2010 | Lu | B60Q 9/005 340/435 |
| 2010/0293030 A1 | 11/2010 | Wu | |
| 2010/0332133 A1* | 12/2010 | Harris | G01C 21/26 701/431 |
| 2011/0050463 A1* | 3/2011 | Yu | G01S 5/0027 340/993 |
| 2011/0053642 A1* | 3/2011 | Lee | H04W 4/029 455/556.1 |
| 2011/0059693 A1 | 3/2011 | O'Sullivan | |
| 2011/0068954 A1* | 3/2011 | McQuade | G08G 1/20 340/988 |
| 2011/0099040 A1 | 4/2011 | Felt et al. | |
| 2011/0216200 A1* | 9/2011 | Chung | B61L 15/0027 348/148 |
| 2011/0313594 A1* | 12/2011 | Kato | G07C 5/008 701/2 |
| 2012/0041675 A1 | 2/2012 | Juliver et al. | |
| 2012/0130627 A1* | 5/2012 | Islam | G06Q 10/08 701/300 |
| 2012/0154591 A1* | 6/2012 | Baur | B60R 1/00 348/148 |
| 2012/0191269 A1 | 7/2012 | Chen et al. | |
| 2012/0277952 A1* | 11/2012 | MacNeille | G01C 21/3453 701/36 |
| 2013/0046456 A1* | 2/2013 | Scofield | G01C 21/3423 701/117 |
| 2013/0144660 A1* | 6/2013 | Martin | G06Q 10/02 705/5 |
| 2013/0149998 A1 | 6/2013 | Yi et al. | |
| 2013/0204463 A1 | 8/2013 | Chiappetta | |
| 2013/0211916 A1* | 8/2013 | Putman | G06Q 30/02 705/14.58 |
| 2013/0286206 A1* | 10/2013 | Ozaki | H04N 7/18 348/148 |
| 2013/0289858 A1 | 10/2013 | Mangiat et al. | |
| 2014/0172727 A1* | 6/2014 | Abhyanker | G06Q 50/30 705/307 |
| 2014/0200739 A1* | 7/2014 | Kirsch | G07C 5/008 701/1 |
| 2014/0268353 A1* | 9/2014 | Fujimura | G02B 27/0101 359/630 |
| 2015/0032328 A1 | 1/2015 | Healey et al. | |
| 2015/0175072 A1 | 6/2015 | Sabeti | |
| 2015/0199619 A1* | 7/2015 | Ichinose | G01C 21/3469 705/5 |
| 2015/0220791 A1* | 8/2015 | Wu | G06K 9/00812 348/148 |
| 2015/0338849 A1 | 11/2015 | Nemec et al. | |
| 2015/0346727 A1 | 12/2015 | Ramanujam | |
| 2016/0161266 A1 | 6/2016 | Crawford et al. | |
| 2017/0153714 A1 | 6/2017 | Gao et al. | |

OTHER PUBLICATIONS

C. Brownell, "Shared Autonomous Taxi Networks: An Analysis of Transportation Demand in NJ and a 21st Century Solution for Congestion," BS thesis. Princeton University, Princeton, NJ, 2013.
International Search Report and Written Opinion for PCT Application No. PCT/US2018/031780, dated Jul. 16, 2018. 15 pages.

* cited by examiner

AUGMENTED REALITY DISPLAY FOR IDENTIFYING VEHICLES TO PRESERVE USER PRIVACY

BACKGROUND

Autonomous vehicles, such as vehicles which do not require a human driver, can be used to aid in the transport of passengers or items from one location to another. With a typical taxi or car service, a human driver can interact with a passenger to identify himself to that passenger. However, when an autonomous vehicle attempts to pick up a passenger or drop off a delivery, it can be difficult for the user being picked up or retrieving the item to know which autonomous vehicle is assigned to them. This can be exacerbated if there are numerous vehicles being sent to the same location to pick up multiple passengers or items. A passenger may not know how to confirm which vehicle belongs to him or her. As an example, this can also lead to passengers interacting with vehicles which were not assigned to them.

BRIEF SUMMARY

One aspect of the disclosure provides a method. The method includes sending, by a client computing device, a request for a vehicle. The request identifies location of the client computing device. The method also includes the client computing device receiving location information identifying a current location of a vehicle dispatched to the location of the client computing device in response to the request and displaying a camera view on a display of the client computing device. The camera view corresponds to information in a field of view of a camera of the client computing device. When the current location of the vehicle is within the field of view of the camera and a threshold value of the location of the client device, the client computing device displays an indicator on the display at a location corresponding to the current location of the vehicle.

In one example, the method also includes providing a notification that the location of the vehicle is within a threshold distance of the location of the client computing device and receiving a request to display the camera view in response to the notification. In this example, the camera view is displayed in response to the request to display the camera view. In another example, the camera view is displayed automatically when the location of the vehicle is within the threshold value of the location of the client computing device. In another example, the location information identifying the current location of the vehicle is updated such that updated current location is used to display the indicator. In another example, the method also includes determining, by the client computing device, when the current location of the vehicle is within the threshold distance or time of the location of the client computing device. In another example, the method includes receiving a notification from one or more server computing devices, the notification indicating that the current location of the vehicle is within the threshold distance or time of the location of the client computing device. In another example, the indicator indicates that the vehicle was dispatched to a user of the client computing device. In another example, the threshold value is an amount of time to reach the location of the client computing device. In another example, the threshold value is a remaining distance along a route to reach the location of the client computing device.

Another aspect of the disclosure provides a system including a client computing device having one or more processors. The client computing device is configured to send a request for a vehicle. The request identifies a location of the client computing device. The client computing device is also configured to receive location information identifying a current location of a vehicle dispatched to the location of the client computing device in response to the request and display a camera view on a display of the client computing device. The camera view corresponds to information in a field of view of a camera of the client computing device. The client computing devices are also configured to, when the current location of the vehicle is within the field of view of the camera and a threshold value of the location of the client device, display an indicator on the display at a location corresponding to the current location of the vehicle.

In one example, the client computing device is also configured to provide a notification that the location of the vehicle is within a threshold distance of the location of the client computing device and receive a request to display the camera view in response to the notification, wherein the camera view is displayed in response to the request to display the camera view. In another example, the camera view is displayed automatically when the location of the vehicle is within the threshold value of the location of the client computing device. In another example, the location information identifying the current location of the vehicle is updated such that updated current location is used to display the indicator. In another example, the client computing device is further configured to determine when the current location of the vehicle is within the threshold distance or time of the location of the client computing device. In another example, the client computing device is further configured to receive a notification from one or more server computing devices, the notification indicating that the current location of the vehicle is within the threshold distance or time of the location of the client computing device. In another example, the indicator indicates that the vehicle was dispatched to a user of the client computing device. In another example, the threshold value is an amount of time to reach the location of the client computing device. In another example, the threshold value is a remaining distance along a route to reach the location of the client computing device.

A further aspect of the disclosure provides a non-transitory computer-readable storage medium on which computer readable instructions of a program are stored. The instructions, when executed by a processor, cause the processor to perform a method. The method includes sending a request for a vehicle. The request identifies a location of the client computing device. The method also includes receiving location information identifying a current location of a vehicle dispatched to the location of the client computing device in response to the request and displaying a camera view on a display of the client computing device. The camera view corresponds to information in a field of view of a camera of the client computing device. The method also includes, when the current location of the vehicle is within the field of view of the camera and a threshold value of the location of the client device, displaying an indicator on the display at a location corresponding to the current location of the vehicle.

In one example, the method also includes providing a notification that the location of the vehicle is within a threshold distance of the location of the client computing device and receiving a request to display the camera view in response to the notification, wherein the camera view is displayed in response to the request to display the camera view.

DETAILED DESCRIPTION

The technology relates to providing a user with a way to identify or verify a vehicle dispatched to pick up a user or drop off a delivery to the user. For examples the vehicle may be a driverless (autonomous) vehicle, such that a driver would not be available to help the user identify the correct vehicle. In this regard, once the vehicle is dispatched to pick up the passenger, a central dispatching computing device may provide the user's mobile computing device such as a mobile phone or wearable computing device or system (e.g., head-mounted, wrist, clip-on, etc.) with information about the vehicle's location. When the vehicle can be seen on the mobile computing device, for example, through a camera view, the information may be used by the client computing device to highlight or otherwise indicate the vehicle to the user.

As noted above, the technology may be applicable in various circumstances. In one instance, a user may use a client device, such as a mobile phone or head-mounted computing device, to request a vehicle. The request may be sent to a centralized dispatching computing device which selects or assigns a vehicle to the requesting user. After doing so, the vehicle's location may be provided to the mobile computing device by the centralized dispatching computing device.

The user may view his or her surroundings on a display of the mobile computing device. When the vehicle is within a certain distance of the user or at some location visible to the user (e.g., with no buildings or other objects in the way), the user may hold the mobile device in the direction of the vehicle. By doing so, the mobile computing device may calculate the approximate location of the vehicle relative to the display. Using this information, the mobile computing device may highlight the vehicle or display a box, text, or other information proximate to the location of the vehicle on the display.

This may allow the user to quickly and easily identify that vehicle from any other vehicles in the area. This also prevents other persons from knowing who the vehicle is picking up or dropping off a delivery to. Thus, rather than simply getting a notification that the user's vehicle is "here," the user also receives also information which may be used to identify the vehicle to the user without compromising the user's privacy.

Figure 1:
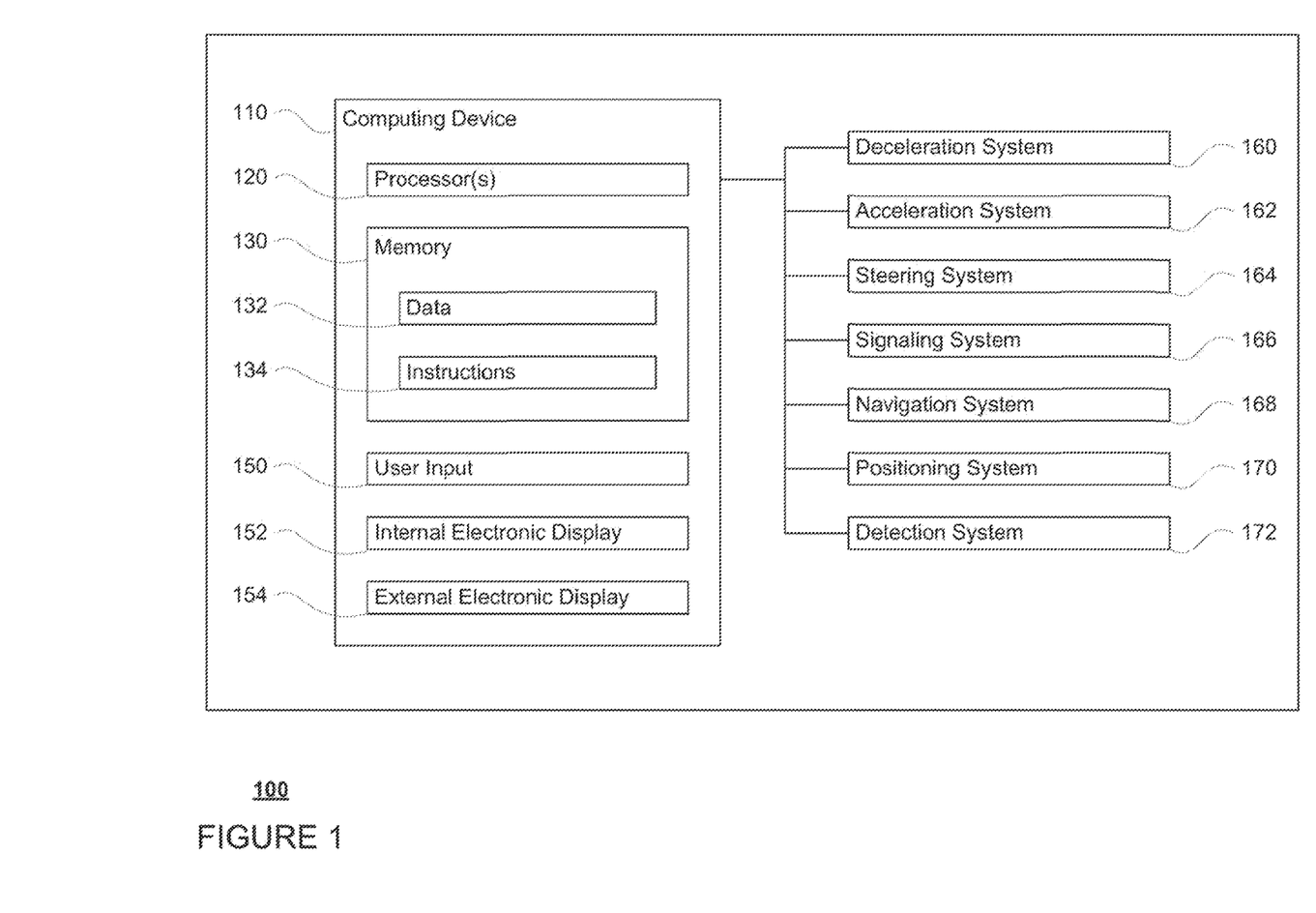
FIG. 1 is a functional diagram of an example vehicle in accordance with an exemplary embodiment.

As shown in FIG. 1, a vehicle 100 in accordance with aspects of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152 as well as an external electronic display 154. In this regard, internal electronic display 152 may be located within a cabin of vehicle 100 and may be used by computing device 110 to provide information to passengers within the vehicle 100. External electronic display 152 may be located eternally or mounted on an external surface of the vehicle 100 and may be used by computing device 110 to provide information to potential passengers or other persons outside of vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 168 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 includes one or more components for detecting objects external to the vehicle such as other vehicles, obstacles in the roadway, traffic signals, signs, trees, etc. For example, the detection system 170 may include lasers, sonar, radar, cameras or any other detection devices which record data which may be processed by computing device 110. In the case where the vehicle is a small passenger vehicle such as a car, the car may include a laser mounted on the roof or other convenient location.

The computing device 110 may control the direction and speed of the vehicle by controlling various components. By way of example, if the vehicle is operating completely autonomously, computing device 110 may navigate the vehicle to a location using data from the detailed map information and navigation system 168. Computer 110 may use the positioning system 170 to determine the vehicle's location and detection system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 164).

Figure 2:
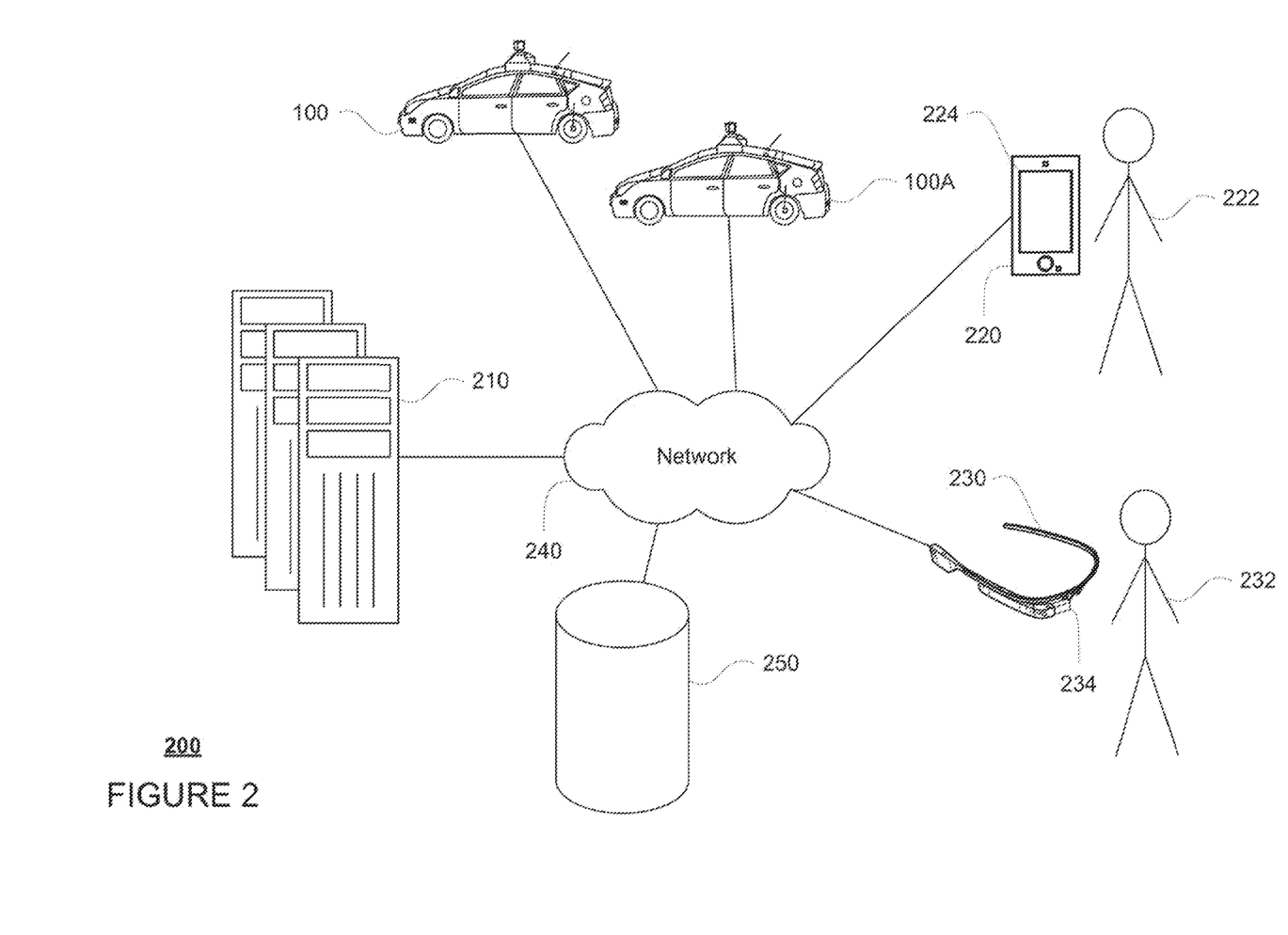
FIG. 2 is a functional diagram of an example system in accordance with an exemplary embodiment.
Figure 3:
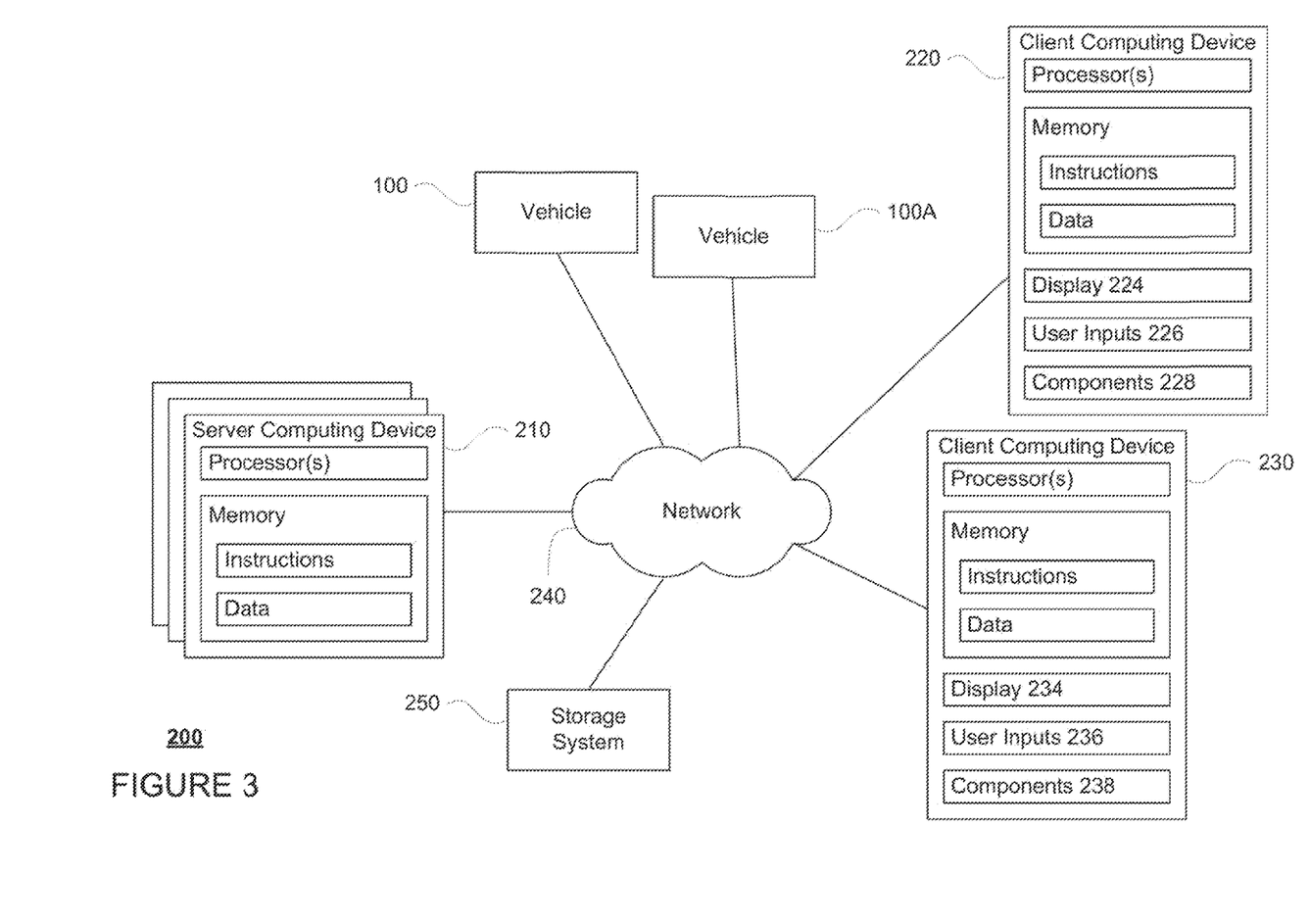
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, and 230 and a storage system 250 connected via a network 240. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, and 230 may include one or more processors, memory, data and instructions. Such processors, memories, data and instructions may be configured similarly to one or more processors 120, memory 130, data 132, and instructions 134 of computing device 110.

The network 240, and intervening nodes, may include various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220 and 230 via the network 240. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 240 to transmit and present information to a user, such as user 222, or 232, on a display, such as displays 224 or 234 of computing devices 220 or 230. In this regard, computing devices 220 and 230 may be considered client computing devices.

As shown in FIG. 3, each client computing device 220 or 230 may be a personal computing device intended for use by a user 222 or 232, and have all of the components normally used in connection with a personal computing device including a one or more processors (e.g., a central processing unit (CPU)), memory (e.g., RAM and internal hard drives) storing data and instructions, a display such as displays 224 and 234 (e.g., a monitor having a screen, a touch-screen, a projector, a television, or other device that is operable to display information), and user input devices 226 and 236 (e.g., a mouse, keyboard, touch-screen or microphone). The client computing devices may also include a camera for recording video streams, speakers, a network interface device, and all of the components used for connecting these elements to one another. In addition, the client computing devices may also include components 228 and 238 for determining the position and orientation of client computing devices 220 and 230. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220 and 230 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device, or a netbook that is capable of obtaining information via the Internet. In another example, client computing device 230 may be a wearable computing system, shown as a head-mounted computing system in FIG. 2. As an example the user may input information using a small keyboard, a keypad, microphone, using visual signals with a camera, or a touch screen.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (north, south, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 240 as shown in FIG. 2 and/or may be directly connected to or incorporated into any of the computing devices 110, 210, 220, 230, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application to client computing devices 220 and 230. The client computing device may then transmit a request for the application over the network, for example, to one or more server computing devices 210, and in response, receive the application. The application may be installed locally at the client computing device. As part of an initial set up of the application, the user may grant the application permission to send the location of the user's client computing device as needed in order to provide vehicle dispatching services to the user.

Once the application is installed and setup, the user may request a vehicle. As an example, a user such as user 232 may use client computing device 230 to send a request to one or more server computing devices 210 for a vehicle to deliver an item to another user, such as user 222, at the user's current location. In this regard, the request may identify the user 222, and not any location information for user 222. In response, the one or more server computing devices 210 may communicate with client computing device 220 in order to determine the current location of client computing device 220, assumed to be the current location of user 222. Alternatively, user 222 may request a vehicle to transport that user to a particular destination location, and the location of client computing device 220 may be sent to the one or more server computing devices 210 as part of the request.

Figure 4:
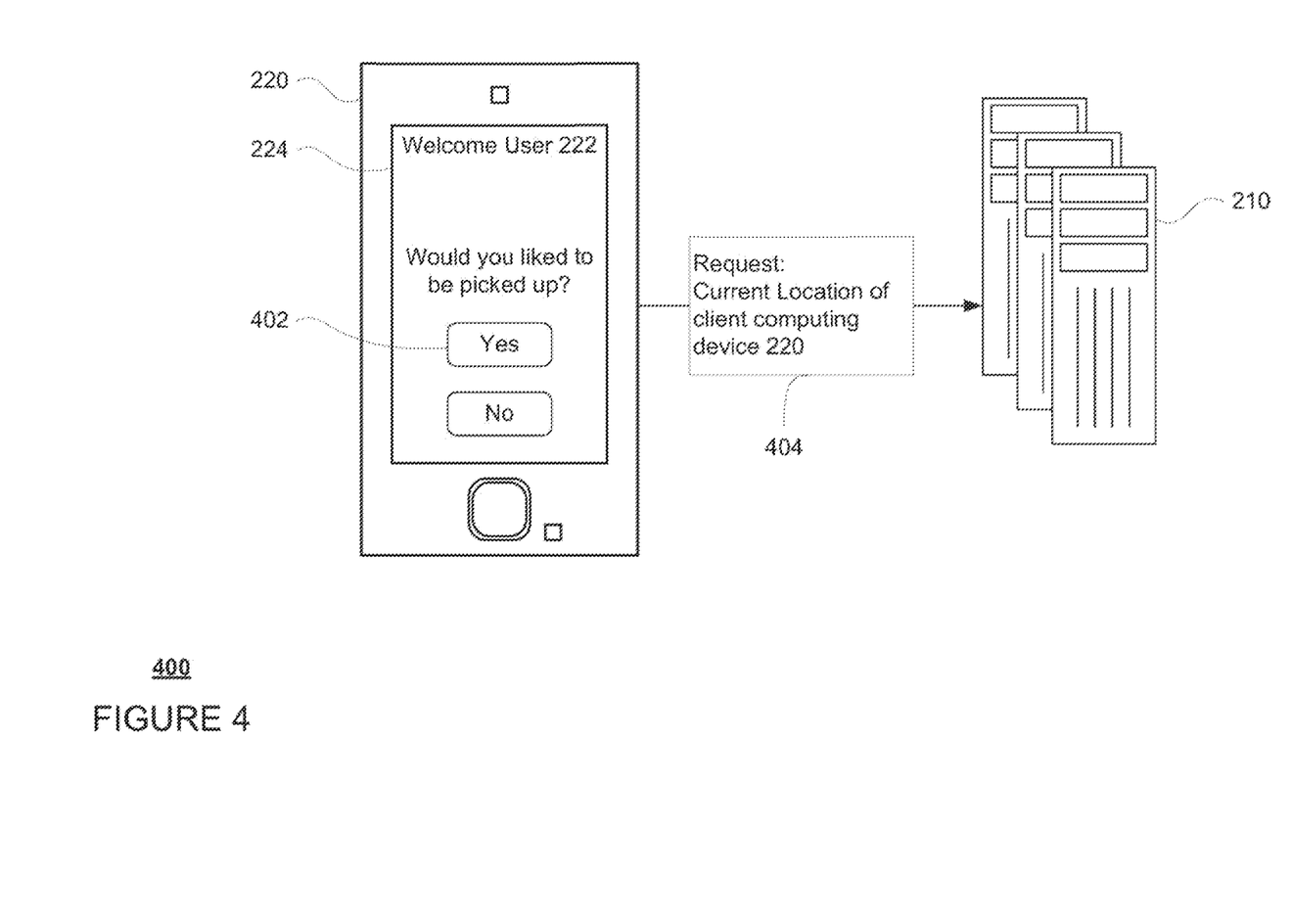
FIG. 4 is an example diagram of a client computing device sending a request to one or more server computing devices in accordance with aspects of the disclosure.

FIG. 4 is an example 400 of a request for a vehicle being made by a user at a client computing device and sent to one or more server computing devices. In this example, client computing device 220 may run an application as described above. Display 224 of client computing device 220 provides a user, such as user 222, with an option 402 to request a vehicle. In response, the client computing device 220 sends a request 404 to the one or more server computing devices 210, for example, via network 240. In this example, the request 404 includes user information which can include or be used to identify the user's client device and/or credentials for authenticating the user and identifying the user's account information as described above. The request 404 also includes the current location of the client computing device 220. As noted above, depending upon the situation information may be sent automatically as part of the request, or in response to a specific request from the one or more server computing devices 210. Although not shown in the example of FIG. 4, if the user has entered a destination location, this information may also be included in the request.

In response to receiving a request, the one or more server computing devices may select a vehicle to be dispatched based upon the location of the client computing device. In order to do so, the one or more server computing devices 210 may identify vehicles that are available to be dispatched, such as any vehicles of the fleet that are not currently being used to transport a user or item. The one or more server computing devices may then use the routing information of storage system 250 to determine which of the available vehicles is closest to the location of the client computing device. The one or more server computing devices may dispatch the closest available vehicle, or rather, send instructions to the computing device of the closest available vehicle to go to the location of the client computing device. If the user is to be transported to another location, the one or more server computing devices may also identify the particular destination location to the closest available vehicle.

Figure 5:
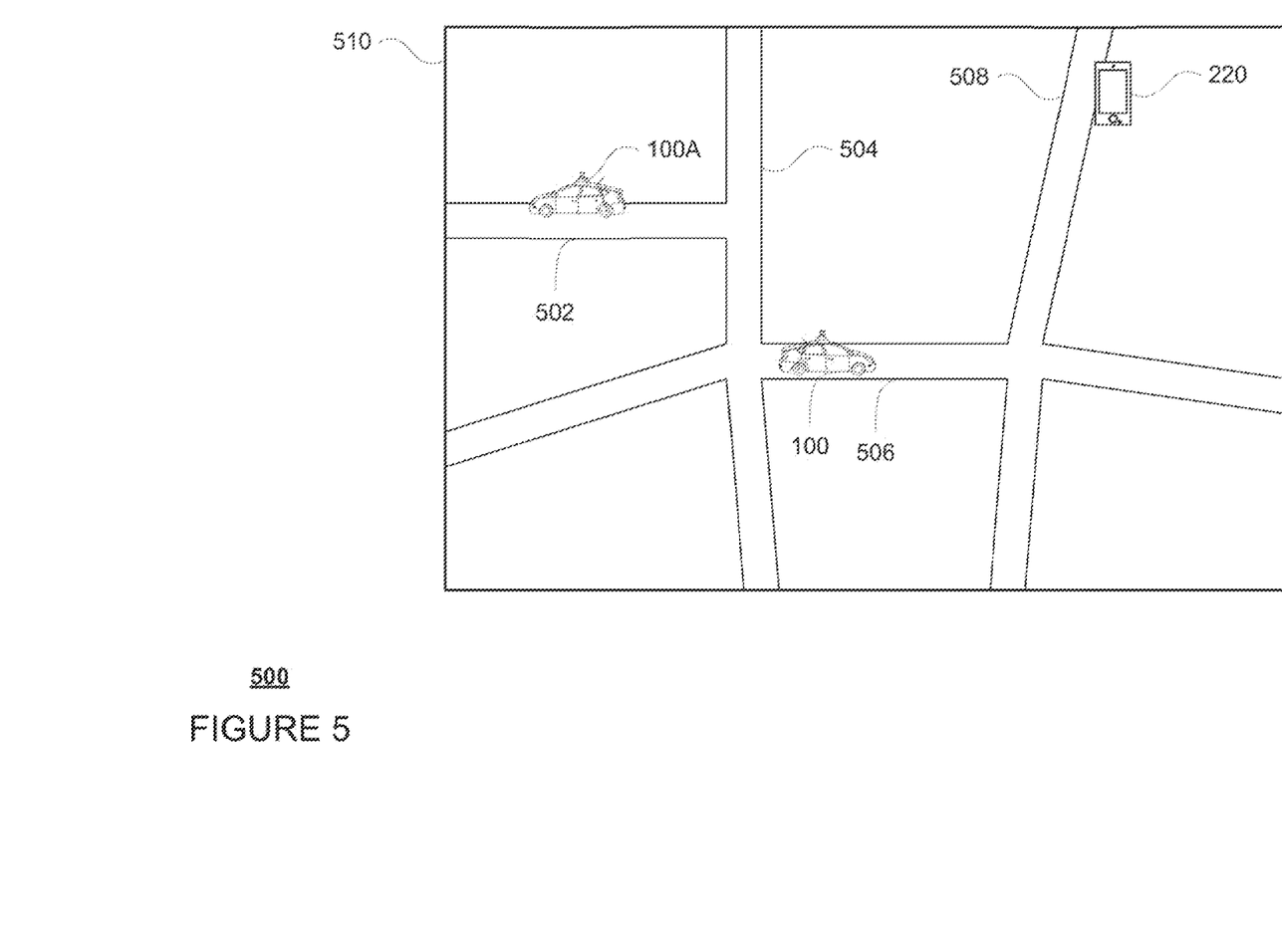
FIG. 5 is an example illustration of a map in accordance with aspects of the disclosure.

FIG. 5 is an example illustration 500 of a map 510. The information depicted in this illustration may be used by the one or more server computing devices to select a closest available vehicle. This map information may be a part of the routing data of storage system 150. The map 510 includes a plurality of roads 502, 504, and 506. In this example, the current locations of vehicles 100 and 100A, as reported to the one or more server computing devices by these vehicles, are displayed. In this example, both vehicles are currently available, while other vehicles in the fleet, not shown, may not be available. In addition, client computing device 220 is depicted at its relative location on the map 510. In this example, vehicle 100 only has to travel a short distance along road 504 and 506, while vehicle 100A must turn around before traveling along roads 502, 504, and 506, and before reaching the location of the client computing device 220. Using this information, the one or more server computing devices may determine that vehicle 100 would reach the location of client computing device 220 faster than vehicle 100A. Thus, in this example, the one or more server computing devices may identify vehicle 100 as the closest available vehicle.

Figure 6:
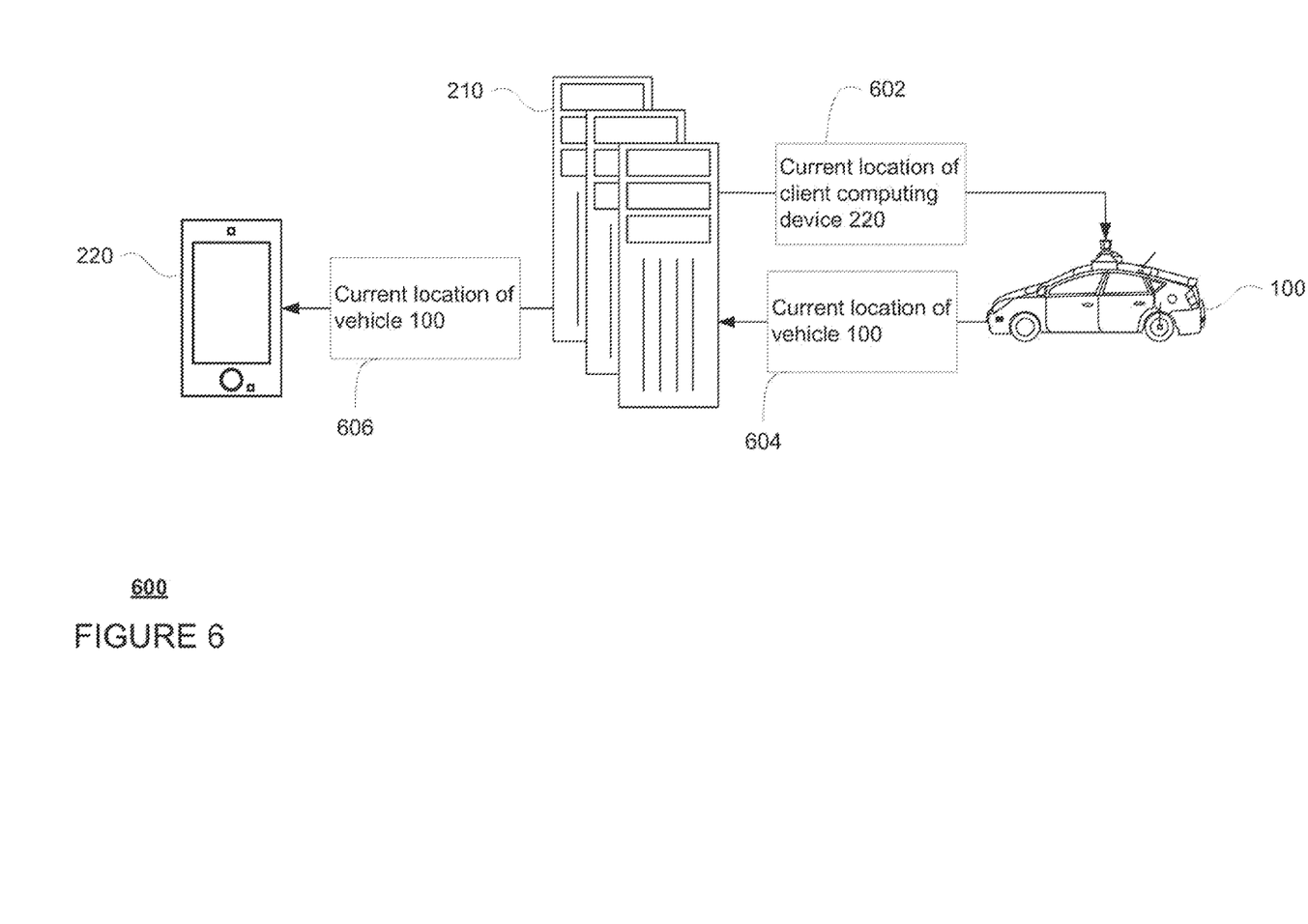
FIG. 6 is an example diagram of one or more server computing devices sending messages to a client computing device and a vehicle in accordance with aspects of the disclosure.

Once the one or more server computing devices have identified a closest available vehicle, the one or more server computing devices may dispatch that vehicle. FIG. 6 is an example diagram 600 of one or more server computing devices 210 dispatching a vehicle. In this example, the server computing device sends a dispatch message 602 to the closest available vehicle, selected as vehicle 100 in the example of FIG. 5. Returning to FIG. 6, the dispatch message includes the current location of the client computing device 220, for example, the location received in the example of FIG. 4.

Once the vehicle is dispatched, the vehicle's computing device may control the vehicle in order to reach the location of the user provided by the one or more server computing devices. The vehicle's computing device may communicate with the vehicle's navigation system in order to identify a route to the location of the user. The one or more server computing devices may also send updated location information should the location of the client computing device change before the vehicle has reached the location.

As the computing device controls and guides the vehicle to the location of the user, the computing device may continuously send the vehicle's location, for example as determined by the positioning system, to the one or more server computing devices. The one or more server computing devise may, in turn, forward this location to the client computing device. Returning to FIG. 6, example diagram 600 of also includes vehicle 100 sending message 604 to one or more server computing devices 210. Message 604 includes the current location of vehicle 100, for example using GPS or other location coordinates as determined by positioning system 170. The one or more server computing devices also send message 606 to the client computing device 220 that includes the current location of vehicle 100, received from vehicle 100.

Figure 7:
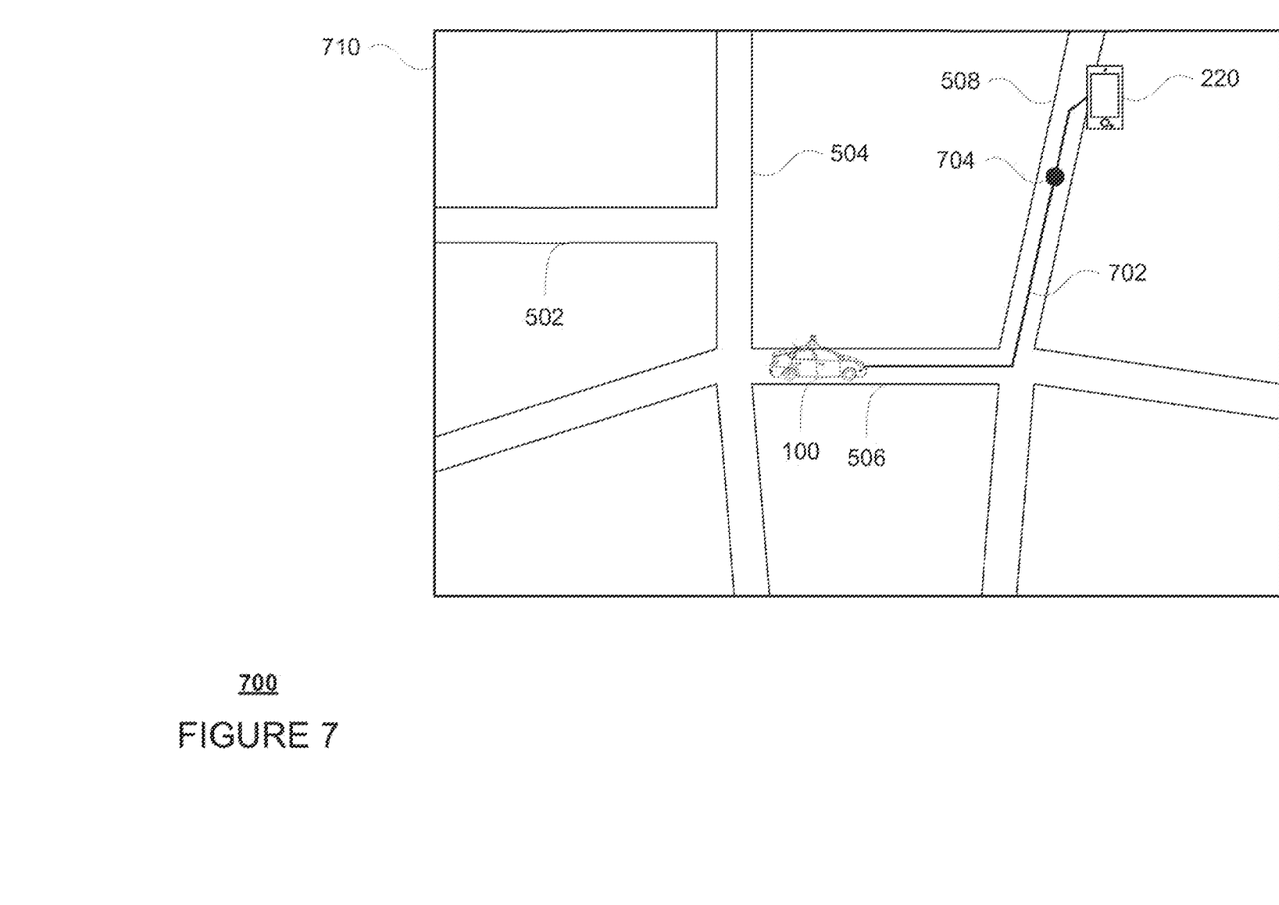
FIG. 7 is an example illustration of a map in accordance with aspects of the disclosure.

The location of the vehicle may be used to estimate the vehicle's distance from the user in order to determine when the vehicle has reached a threshold distance or time to the user. This threshold distance may be determined, for example, as a duration in time (e.g., there are 2 minutes or more or less left along the route to reach the location of the user). Alternatively, the distance threshold may be a physical distance such as 50 meters, 0.2 miles, 2 city blocks, or more or less, directly between the vehicle and the user (e.g., a straight line) or along the route until the vehicle reaches the location of the user or a distance. FIG. 7 is an example illustration 700 of a map 710. Roads 502, 504, and 506 correspond to such roads of map 510. In this example, the computing device 110 of vehicle 100, now a dispatched vehicle, has used navigation system 166 to plan a route 702 to the current location of the client computing device 220. The computing device 110 may also maneuver the vehicle using the various other systems of the vehicle in order to reach the current location of the client computing device 220. Here, "current location of the client computing device 220" may refer to the location received as a part of message 404 of FIG. 4 or rather a periodically updated value received by the one or more server computing devices and sent to the dispatched vehicle. Returning to the example of FIG. 7, the computing device 110 may also identify location point 702, or the point at which the vehicle will be at the threshold distance or time from the current location of the client computing device 220.

This estimation and determination of when the vehicle reaches the threshold distance may be made, for example, by the client computing device, the one or more server computing devices, and/or the computing device of the vehicle. If the determination is made by the computing device of the vehicle, a notification may be sent to the one or more server computing devices when the vehicle has reached the threshold distance. In response to receiving the notification, the one or more server computing devices may send a further notification to the client computing device. Alternatively, if the determination is made by the one or more server computing devices, for example using the routing data of storage system 250, a notification may be sent to the client computing device when the vehicle has reached the threshold distance. In some examples, the notification may be sent directly from the vehicle's computing device to the client computing device, in other words, without first being received by the one or more server computing devices.

The notification from the one or more server computing devices may cause the application to automatically display a camera view of the client computing device's surroundings. Alternatively, the client computing device may determine that the vehicle has reached the threshold distance, for example using routing data of storage system 250 received from one or more server computing devices 210 as needed. The application may use this determination to automatically display the camera view. As an example, a camera view may be a display of information on the client computing device's display using input from the camera of the client computing device.

As an alternative, rather than automatically displaying the camera view, the client computing device may provide a notification to the user, for example by displaying a prompt and an audible notification, to indicate that the application is ready to display the camera view. In response, the user may confirm that he would like to see the camera view, for example, by selecting some such option on the display, and the client computing device may switch to the camera view.

Once in the camera view, the user may hold the client computing device so that the camera points in the direction of the vehicle. While doing so, the client computing device may determine when a field of view of the camera includes or overlaps with the location of the vehicle. For example, using the location and orientation information provided by components 228 as well as the location of the vehicle 100 as provided by the one or more server computing devices 210, the client computing device 220 may determine how the client computing device is oriented and positioned relative to the vehicle. In this regard, the client computing device may also determine when the location of the vehicle is within an area captured by a camera of the client computing device.

The client computing device may provide instructions on the display 224 in order to direct the user to move the field of view of the camera in the direction of the vehicle. As an example, arrows may be provided on the display to direct the user on how to move the client computing device such that the vehicle appears on the display.

Figure 8:
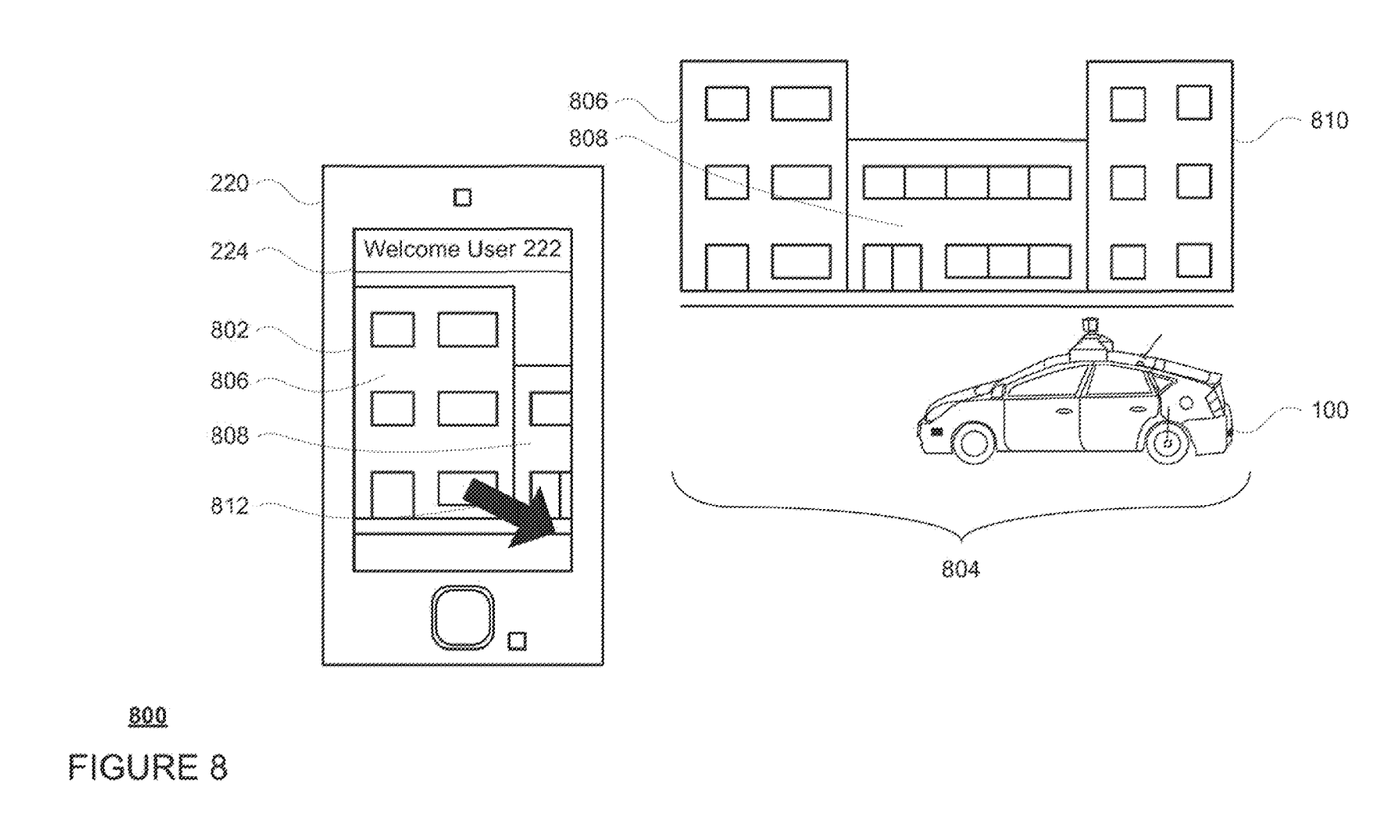
FIG. 8 is an example diagram of a client computing device and a vehicle in accordance with aspects of the disclosure.

Diagram 800 of FIG. 8 is an example of client computing device 220 displaying a camera view 802. Camera view 802 includes objects that are within the field of view of the camera of client computing device 220 (not shown). In this example, a plurality of objects as shown as being within an environment 804 of the client computing device 220. Some of these objects are included in the field of view of the client computing device's camera and are therefore displayed in the camera view 802. In this example, building 806 can be seen both in the camera view 802 as well as in the environment 804. In addition, part of building 808 can be seen in the camera view. Building 810, although it is within the environment 804, is not within the camera view 802 as it is not within the camera's field of view. Similarly, vehicle 100 is not within the camera's field of view, so it is not depicted in the camera view 802. Arrow 812 indicates to the user, that the client computing device must be moved in the direction of arrow 812 in order to put vehicle 100 within the field of view of the camera.

When the location of the vehicle is within a threshold distance of the client computing device and within the field of view of the camera shown in the camera view, the client computing device may display an annotation or indication at a point on the display where the vehicle should be. In this regard, the client computing device translates the location of the vehicle, such as GPS coordinates, into a coordinate system relative to the display of client computing device. Thus, the indication is placed at a 2D location on the display that corresponds to a three dimensional location of the vehicle. As an example, the indication may include highlighting the vehicle in a specific color (red, pink, blue, etc.) and/or displaying a box, text, or other information proximate to the location of the vehicle on the display.

Figure 9:
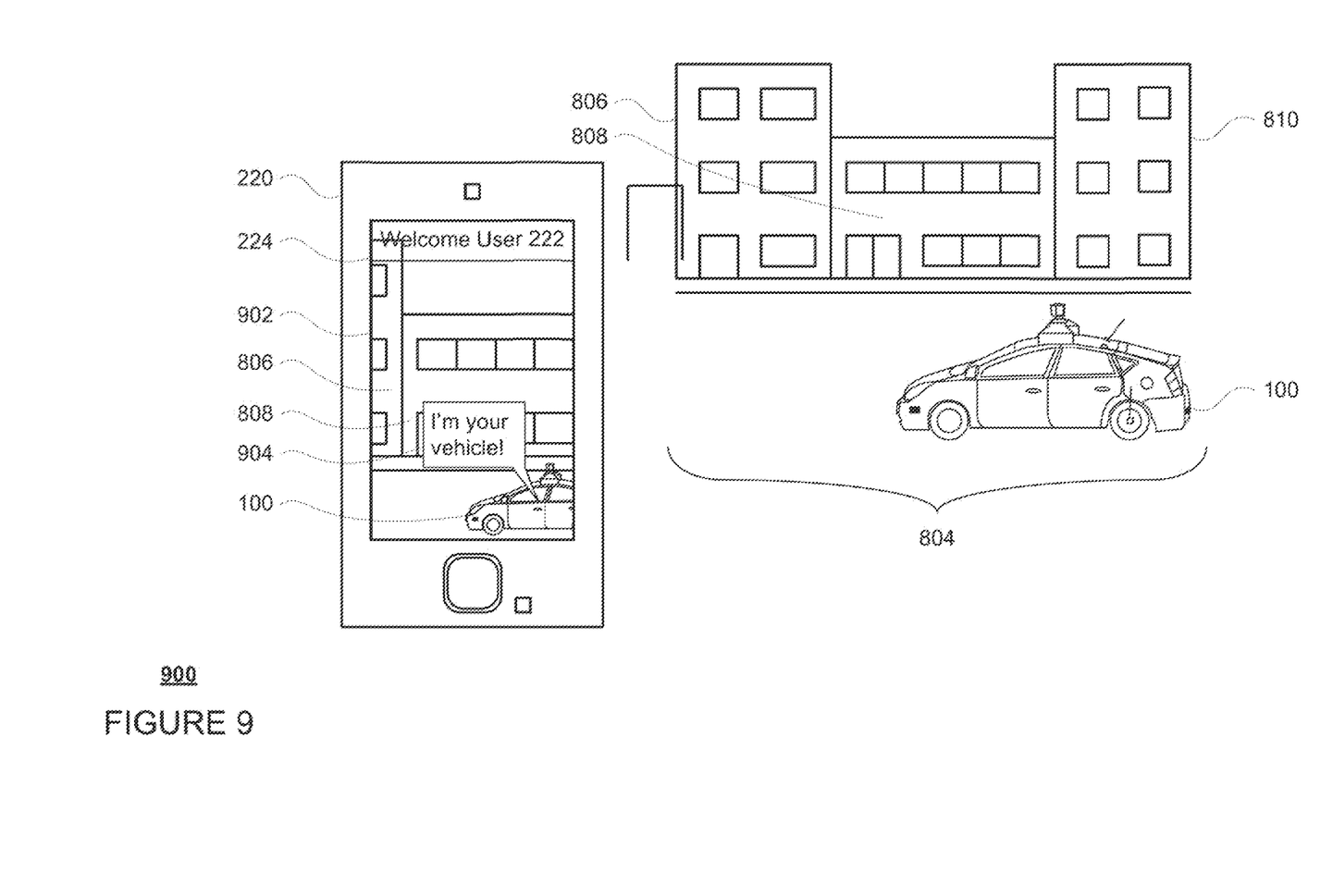
FIG. 9 is another example diagram of a client computing device and a vehicle in accordance with aspects of the disclosure.

Diagram 900 of FIG. 9 is an example of client computing device 220 displaying a camera view 902. In this example, the client device has been moved from its location and orientation as depicted in FIG. 8 such that the field of view of the camera now includes vehicle 100. In this regard, vehicle 100 now appears in camera view 902 as well as a larger portion of building 808 and a smaller portion of building 806. Example 900 also includes an annotation 904 that is displayed proximate to the vehicle 100 in the camera view 902. In this regard, annotation 904 identifies vehicle 100 as the vehicle that has been dispatched to the location of user 222's client computing device.

Figure 10:
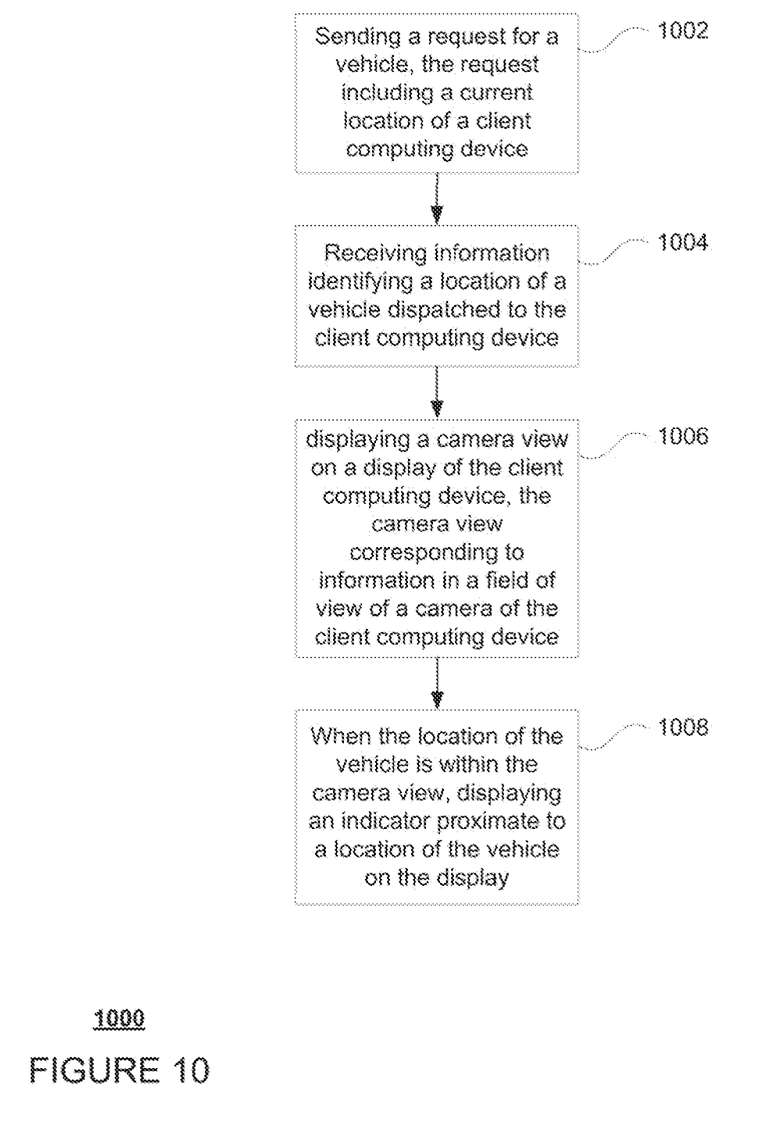
FIG. 10 is a flow diagram in accordance with aspects of the disclosure.

Flow diagram 1000 of FIG. 10 is an example of some of the aspects described above which may be performed by a client computing device such as client computing devices 220 or 230. Flow diagram 1000 is merely one implementation of the features described above, and thus, various other combinations and operations of the features described may also be used. In the example of FIG. 10, a request for a vehicle identifying a current location of the client computing device is sent at block 1002. Information identifying a location of a vehicle dispatched to the client computing device is received at block 1004. When the location of the vehicle is within a threshold distance, a camera view is displayed on a display of the client computing device at block 1006. This camera view corresponds to information in a field of view of a camera of the client computing device. When the location of the vehicle is within the camera view, an indicator is displayed proximate to a location of the vehicle on the display.

Accordingly, rather than simply getting a notification that the user's vehicle is "here," the user also receives also information which may be used to identify the vehicle to the user without compromising the user's privacy. Thus, as the vehicle approaches the user, the user is able to quickly and easily identify that the vehicle has been dispatched to the user (or rather, the user's client computing device). This also prevents other persons from knowing who the vehicle is picking up or to whom the vehicle is dropping off a delivery.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
sending, by a client computing device, a request for a vehicle, the request identifying a location of the client computing device;

receiving, by the client computing device from a remote computing device, location information identifying a current location of a vehicle dispatched to the location of the client computing device in response to the request;

when the current location of the vehicle is within a threshold value of the location of the client computing device, displaying, by the client computing device, a notification indicating that a camera view may be displayed, the camera view corresponding to information in a field of view of a camera of the client computing device;

displaying, by the client computing device, the camera view on a display of the client computing device while the current location of the vehicle is within the threshold value of the location of the client computing device;

when the current location of the vehicle is within the field of view of the camera, displaying, by the client computing device, an indicator on the camera view, the indicator highlighting the current location of the vehicle in order to identify the location of the dispatched vehicle to a user associated with the client computing device; and when the current location of the vehicle is not within the field of view of the camera, displaying, by the client computing device, a guide symbol on the camera view, the guide symbol indicating a direction to move the client computing device in order to place the vehicle within the field of view of the camera while the vehicle is traveling towards the client computing device.

2. The method of claim 1, further comprising:
receiving a request to display the camera view in response to the notification, wherein the camera view is displayed in response to the request to display the camera view.

3. The method of claim 1, wherein the location information identifying the current location of the vehicle is updated such that updated current location is used to display the indicator.

4. The method of claim 1, further comprising determining, by the client computing device, when the current location of the vehicle is within a threshold distance or time of the location of the client computing device.

5. The method of claim 1, further comprising receiving a notification from one or more server computing devices, the notification indicating that the current location of the vehicle is within a threshold distance or time of the location of the client computing device.

6. The method of claim 1, wherein the indicator includes at least one of a color highlight of the current location of the vehicle on the display, a symbol proximate to the location of the current location of the vehicle on the display, or text proximate to the location of the current location of the vehicle on the display.

7. The method of claim 1, wherein the threshold value is an amount of time to reach the location of the client computing device.

8. The method of claim 1, wherein the threshold value is a remaining distance along a route to reach the location of the client computing device.

9. The method of claim 1, wherein the request for the vehicle excludes an identity of the user associated with the client computing device.

10. A system comprising a client computing device having one or more processors, the client computing device being configured to:

send a request for a vehicle, the request identifying a location of the client computing device and excluding an identity of a user associated with the client computing device;

receive from a remote computing device, location information identifying a current location of a vehicle dispatched to the location of the client computing device in response to the request;

display a camera view on a display of the client computing device while the current location of the vehicle is within a threshold value of the location of the client computing device, the camera view corresponding to information in a field of view of a camera of the client computing device;

when the current location of the vehicle is within the field of view of the camera, display an indicator on the camera view, the indicator highlighting the current location of the vehicle in order to identify the location of the dispatched vehicle to the user associated with the client computing device; and when the current location of the vehicle is not within the field of view of the camera display a guide symbol on the camera view, the guide symbol indicating a direction to move the client computing device in order to place the vehicle within the field of view of the camera while the vehicle is traveling towards the client computing device.

11. The system of claim 10, wherein the client computing device is further configured to:
provide a notification that the location of the vehicle is within a threshold period of time of the location of the client computing device, wherein the threshold value is the threshold period of time; and
receive a request to display the camera view in response to the notification, wherein the camera view is displayed in response to the request to display the camera view.

12. The system of claim 10, wherein the camera view is displayed automatically when the location of the vehicle is within the threshold value of the location of the client computing device.

13. The system of claim 10, wherein the location information identifying the current location of the vehicle is updated such that updated current location is used to display the indicator.

14. The system of claim 10, wherein the client computing device is further configured to determine when the current location of the vehicle is within a threshold distance or time of the location of the client computing device.

15. The system of claim 10, wherein the client computing device is further configured to receive a notification from one or more server computing devices, the notification indicating that the current location of the vehicle is within a threshold distance or time of the location of the client computing device.

16. The system of claim 10, wherein the indicator indicates that the vehicle was dispatched to the user of the client computing device.

17. The system of claim 10, wherein the threshold value is an amount of time to reach the location of the client computing device.

18. The system of claim 10, wherein the threshold value is a remaining distance along a route to reach the location of the client computing device.

19. A non-transitory computer-readable storage medium on which computer readable instructions of a program are stored, the instructions, when executed by a processor, cause the processor to perform a method, the method comprising:

sending a request for a vehicle, the request identifying a location of a client computing device;

receiving location information identifying a current location of a vehicle dispatched to the location of the client computing device in response to the request;

when the current location of the vehicle is within a threshold value of the location of the client computing device, displaying a notification indicating that a camera view may be displayed, the camera view corresponding to information in a field of view of a camera of the client computing device;

displaying the camera view on a display of the client computing device while the current location of the vehicle is within the threshold value of the location of the client computing device;

when the current location of the vehicle is within the field of view of the camera, displaying an indicator on the camera view, the indicator highlighting the current location of the vehicle in order to identify the location of the dispatched vehicle to a user associated with the client computing device; and when the current location of the vehicle is not within the field of view of the camera displaying a guide symbol on the camera view, the guide symbol indicating a direction to move the client computing device in order to place the vehicle within the field of view of the camera, wherein the indicator includes at least one of a color highlight of the current location of vehicle on the display, a symbol proximate to the location of the current location of the vehicle on the display, or text proximate to the location of the current location of the vehicle on the display.

20. The medium of claim 19, wherein the method further comprises:

receiving a request to display the camera view in response to the notification, wherein the camera view is displayed in response to the request to display the camera view.

\* \* \* \* \*